US012264031B2

(12) United States Patent
Yokoyama

(10) Patent No.: US 12,264,031 B2
(45) Date of Patent: Apr. 1, 2025

(54) IMAGE FORMING SYSTEM FOR EXECUTING STAPLE PROCESSING

(71) Applicant: CANON KABUSHIKI KAISHA, Tokyo (JP)

(72) Inventor: Seiji Yokoyama, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,388

(22) Filed: Feb. 8, 2023

(65) Prior Publication Data

US 2023/0183035 A1 Jun. 15, 2023

Related U.S. Application Data

(63) Continuation of application No. 17/724,327, filed on Apr. 19, 2022, now Pat. No. 11,603,282, which is a (Continued)

(30) Foreign Application Priority Data

Nov. 14, 2018 (JP) ................................ 2018-213996

(51) Int. Cl.
*B65H 37/04* (2006.01)
*G03G 15/00* (2006.01)

(52) U.S. Cl.
CPC ......... *B65H 37/04* (2013.01); *G03G 15/6544* (2013.01); *B65H 2511/414* (2013.01); (Continued)

(58) Field of Classification Search
CPC ................ B65H 37/04; B65H 2511/51; B65H 2511/414; G03G 15/6544; G03G 2215/00827
(Continued)

(56) References Cited

U.S. PATENT DOCUMENTS 4,795,071 A * 1/1989 Jacobs .................. G03G 15/60 227/7
7,407,156 B2 * 8/2008 Iizuka .................... B65H 31/24 270/58.11
(Continued)

FOREIGN PATENT DOCUMENTS

JP H07187478 A 7/1995
JP 2014125299 A 7/2014

*Primary Examiner* — Leslie A Nicholson, III
(74) *Attorney, Agent, or Firm* — Canon U.S.A., Inc. IP Division

(57) ABSTRACT

An image forming system includes a detection unit to detect a recording material, having an image formed thereon by an image forming unit, placed on a processing tray, a staple unit, a discharge unit, and a discharge tray. A first mode of the system is to discharge the recording material conveyed from the image forming unit to the discharge tray via the processing tray and a second mode involves waiting for instruction for executing. When the detection unit detects the recording material inserted into the processing tray in the second mode, and a recording material first mode conveying instruction is issued in a state of waiting for the executing instruction after the recording material detection, a discharge operation is performed to discharge the recording material inserted into the processing tray to the discharge tray without the staple unit executing staple processing on the recording material inserted into the processing tray.

5 Claims, 6 Drawing Sheets

Related U.S. Application Data continuation of application No. 17/154,911, filed on Jan. 21, 2021, now Pat. No. 11,332,338, which is a continuation of application No. 16/677,499, filed on Nov. 7, 2019, now Pat. No. 10,926,971.

(52) U.S. Cl.
CPC .................... *B65H 2511/51* (2013.01); *G03G 2215/00827* (2013.01)

(58) Field of Classification Search
USPC ............................................ 270/58.08, 58.09
See application file for complete search history.

(56) References Cited

U.S. PATENT DOCUMENTS

| | | | | |
|---|---|---|---|---|
| 8,226,079 | B2 * | 7/2012 | Ozawa | B65H 31/34 270/58.08 |
| 10,926,971 | B2 * | 2/2021 | Yokoyama | G03G 15/6541 |
| 2016/0159605 | A1 * | 6/2016 | Miyahara | B65H 37/04 270/1.01 |

* cited by examiner

IMAGE FORMING SYSTEM FOR EXECUTING STAPLE PROCESSING

CROSS REFERENCE TO RELATED APPLICATIONS

This application is a continuation of U.S. patent application Ser. No. 17/724,327, filed on Apr. 19, 2022, which is a continuation of U.S. patent application Ser. No. 17/154,911, filed on Jan. 21, 2021 and issued as U.S. Pat. No. 11,332,338 on May 17, 2022, which is a continuation of U.S. patent application Ser. No. 16/677,499, filed on Nov. 7, 2019 and issued as U.S. Pat. No. 10,926,971 on Feb. 23, 2021, which claims priority from Japanese Patent Application No. 2018-213996, filed Nov. 14, 2018, all of which are hereby incorporated by reference herein in their entirety.

BACKGROUND

Field

The present disclosure relates to an image forming system including an image forming apparatus for performing an image forming on a recording material, and a post-processing apparatus for performing staple processing on the recording material conveyed from the image forming apparatus.

Description of the Related Art

There is a post-processing apparatus which receives a recording material discharged from an image forming apparatus such as a copying machine or a printer, and executes post-processing. Further, there is a post-processing apparatus which executes staple processing on the received recording material (hereinafter, this function is also referred to as automatic stapling). Further, as another post-processing apparatus, there is a post-processing apparatus which executes staple processing on a recording material inserted from the outside of the apparatus body by a user (hereinafter, this function is also referred to as manual stapling).

Japanese Patent Application Laid-Open No. 2005-206298 discusses a post-processing apparatus which realizes two functions by one staple unit without separately providing a staple unit for performing the automatic stapling and a staple unit for performing the manual stapling. When a user inserts a recording material into a processing tray for executing the automatic stapling from a discharge port in the post-processing apparatus and presses an execution button for the manual stapling, the post-processing apparatus executes the staple processing on the inserted recording material.

However, in the post-processing apparatus of the Japanese Patent Application Laid-Open No. 2005-206298, when the user inserts the recording material into the processing tray from the discharge port in the post-processing apparatus, and leaves the post-processing apparatus without pressing the execution button for the manual stapling, the post-processing apparatus continues a state where the automatic stapling job or the like cannot be executed. As a result, usability may be reduced.

SUMMARY

According to an aspect of the present disclosure, an image forming system includes an image forming unit configured to form an image on a recording material, a processing tray configured to receive the recording material on which the image forming unit forms the image, a detection unit configured to detect the recording material placed on the processing tray, a staple unit configured to execute staple processing on the recording material placed on the processing tray, a discharge unit configured to discharge, from the processing tray through a discharge port, the recording material on which the staple processing is executed by the staple unit, a discharge tray configured to receive the recording material discharged by the discharge unit, an instruction unit configured to issue an instruction for executing the staple processing by the staple unit, and a control unit configured to switch the control unit to a first mode to discharge the recording material conveyed from the image forming unit to the discharge tray via the processing tray and, in a state where the detection unit detects the recording material inserted into the processing tray through the discharge port from an outside of an apparatus body, to switch the control unit to a second mode to wait for the instruction for executing from the instruction unit, and to execute the staple processing on the recording material in response to the instruction for executing, wherein, when the detection unit detects the recording material inserted into the processing tray in the second mode, and an instruction for conveying the recording material in the first mode is issued in a state of waiting for the instruction for executing after the detection of the recording material, the control unit performs a discharge operation to discharge the recording material inserted into the processing tray by the discharge unit to the discharge tray without executing the staple processing by the staple unit on the recording material inserted into the processing tray.

Further features of the present disclosure will become apparent from the following description of exemplary embodiments with reference to the attached drawings.

DESCRIPTION OF THE EMBODIMENTS

A first exemplary embodiment describes a configuration to release a manual stapling mode in accordance with two conditions, which include the elapsed time after a sheet bundle for manual stapling is inserted into a processing tray and a pending state of an automatic stapling job.

Figure 1:
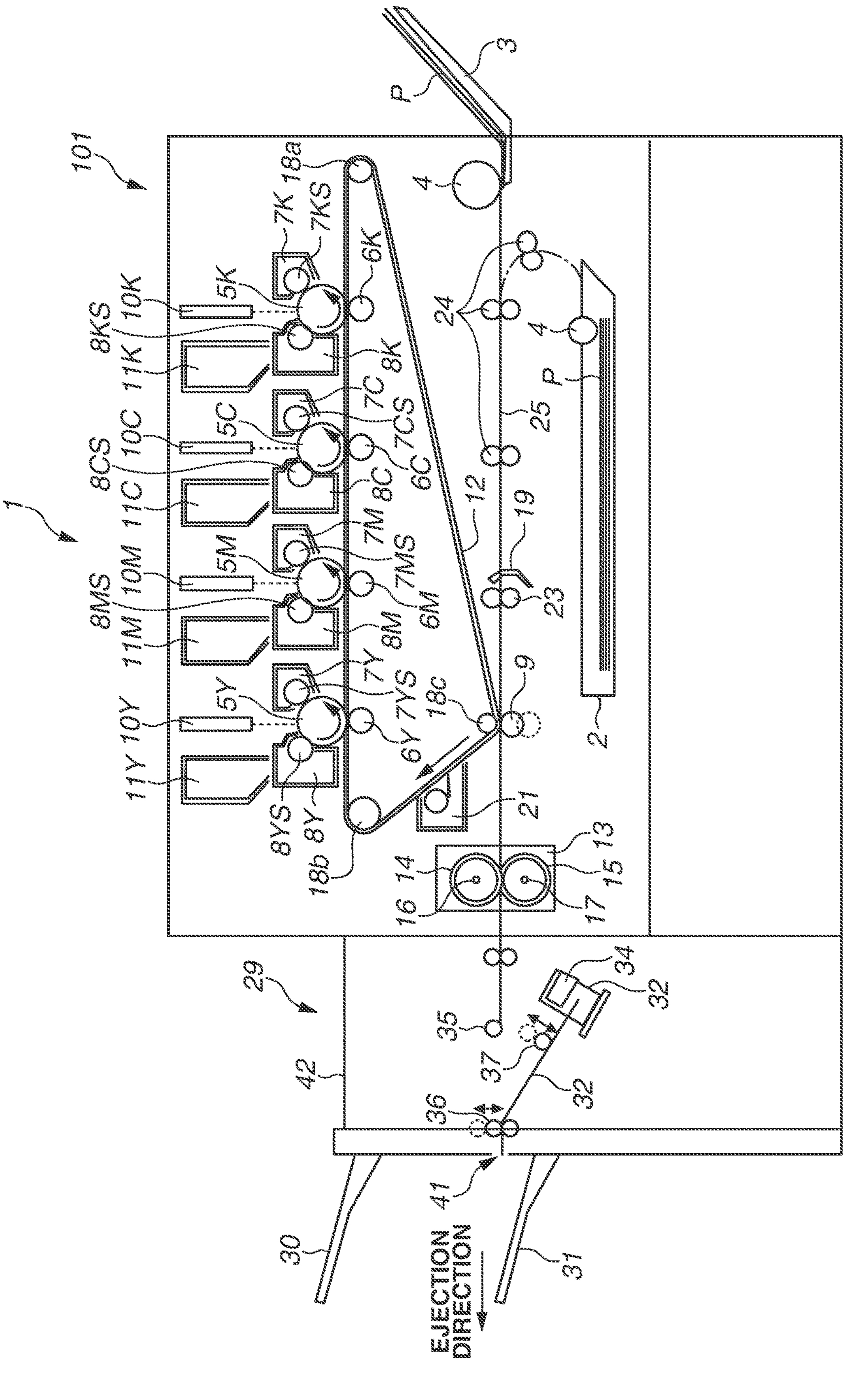
FIG. 1 is a diagram illustrating a configuration of an image forming system.

FIG. 1 is a diagram illustrating a configuration of an image forming system 1 including an image forming apparatus 101 and a post-processing apparatus 29 according to the present exemplary embodiment. The image forming apparatus 101 is an electrophotographic color laser beam printer. The image forming apparatus 101 has photosensitive drums 5Y, 5M, 5C and 5K provided by applying an organic photoconductive layer to an outer periphery of an aluminum cylinder for each station arranged in parallel by the number of developing colors. Here, Y denotes yellow, M denotes magenta, C denotes cyan, and K denotes black, and these notations will be omitted unless necessary. The image forming apparatus 101 includes a charger 7, a laser scanner 10, a developing unit 8, a toner cartridge 11, an intermediate transfer belt 12, a primary transfer roller 6, a secondary transfer roller 9, and a fixing device 13.

In starting a printing operation, the photosensitive drums 5 rotate in the counterclockwise direction (the arrow direction in the drawing) by a drive motor (not illustrated). The charger 7 has charging sleeves 7S (7YS, 7MS, 7CS and 7KS) for charging the photosensitive drums 5. The surface of the photosensitive drum 5 charged by the charging sleeve 7S is exposed to light by the laser scanner 10. The laser scanner 10 exposes the photosensitive drum 5 based on the input image data, and forms an electrostatic latent image on the photosensitive drum 5. The developing unit 8 has developing sleeve 8S (8YS, 8 MS, 8CS or 8CK) to visualize the electrostatic latent image on the photosensitive drum 5. The developing sleeves 8S supply toner to the photosensitive drums 5 to visualize the electrostatic latent image as a toner image.

The intermediate transfer belt 12 is an endless belt stretched by a driving roller 18*a*, and driven rollers 18*b* and 18*c*. The intermediate transfer belt 12 rotates in the clockwise direction (the arrow direction in the drawing) by the driving roller 18*a* while being in contact with the photosensitive drums 5. Then, the toner image is sequentially conveyed to the intermediate transfer belt 12 by the primary transfer roller 6 (hereinafter referred to as a primary transfer). The toner images of each color are overlapped and transferred to the intermediate transfer belt 12 to form a color image on the intermediate transfer belt 12.

The sheet P (recording material) is placed on a sheet feeding cassette 2 or a multi-tray 3. A sheet feed roller 4 feeds the sheet P from the sheet feeding cassette 2 or the multi-tray 3 to a conveyance path 25. The sheet P fed to the conveyance path 25 is conveyed to a registration sensor 19 by a conveying roller 24. When the registration sensor 19 detects the leading edge of the sheet P, the sheet P is further conveyed by a certain amount, and is abutted against a registration roller 23 which is halting. As a result, a deflection (also referred to as a loop) is formed on the sheet P. The registration roller 23 re-conveys the halted sheet P toward the secondary transfer roller 9 so as to match the toner image on the intermediate transfer belt 12 at a timing. The sheet P is nipped and conveyed by the intermediate transfer belt 12 and the secondary transfer roller 9. Then, the toner images on the intermediate transfer belt 12 are transferred to the sheet P collectively (hereinafter, referred to as secondary transfer). When performing the secondary transfer, the secondary transfer roller 9 moves to a position indicated by a solid line, to be in contact with the intermediate transfer belt 12. On the other hand, when the secondary transfer is not performed, the secondary transfer roller 9 moves to a position indicated by a dotted line, to be separated from the intermediate transfer belt 12.

The fixing device 13 fixes the transferred toner images on the sheet P while conveying the sheet P. The fixing device 13 includes a fixing roller 14 for heating the sheet P, and a pressure roller 15 for pressing the sheet P against the fixing roller 14. The fixing roller 14 and the pressure roller 15 are formed in a hollow shape, and heaters 16 and 17 are disposed inside the fixing roller 14 and the pressure roller 15 respectively. A cleaning device 21 cleans the toner remaining on the intermediate transfer belt 12. The cleaned toner is stored in a cleaner container in the cleaning device 21.

The post-processing apparatus 29 receives the sheet P discharged from the image forming apparatus 101, and executes post-processing to the received sheet P. For example, the post-processing apparatus 29 includes a function of sorting the received sheets P into a plurality of discharge trays 30 and 31 (discharge trays), a function of performing staple processing (binding process) to combine a plurality of sheets P, and the like. When sorting the sheets P into the discharge trays 30 and 31, the post-processing apparatus 29 moves the discharge trays 30 and 31 up and down by a motor (not illustrated) for raising and lowering the discharge trays 30 and 31.

The configuration relating to the staple processing will be described in detail. A staple unit 33 executes the staple processing on a plurality of sheets P stacked on a staple tray 32 (processing tray). The staple unit 33 includes a staple cartridge 34. The staple cartridge 34 stores staples for the staple processing.

A description will be given of a case where the staple processing is performed on the sheet P discharged from the image forming apparatus 101. When the sheet P is conveyed from the image forming apparatus 101 to the post-processing apparatus 29, and the rear end of the sheet P passes through a conveyance roller pair 35 to reach a discharge roller pair 36, the discharge roller pair 36 and a drawing roller 37 rotate in the reverse direction, and the sheet P is drawn and stacked on the staple tray 32. After a predetermined number of sheets P are stacked on the staple tray 32, the staple unit 33 executes the staple processing. The bundle of the stapled sheets P is discharged to the discharge tray 30 or 31 by the discharge roller pair 36 through a discharge port 41 provided in the apparatus body 42. Hereinafter, this function will be referred to as automatic stapling.

Next, a description will be given of a case where the staple processing is performed to the sheet bundle inserted from the outside of the apparatus body 42 by a user with reference to FIGS. 1 and 2. Hereinafter, this function will be referred to as manual stapling.

Figure 2:
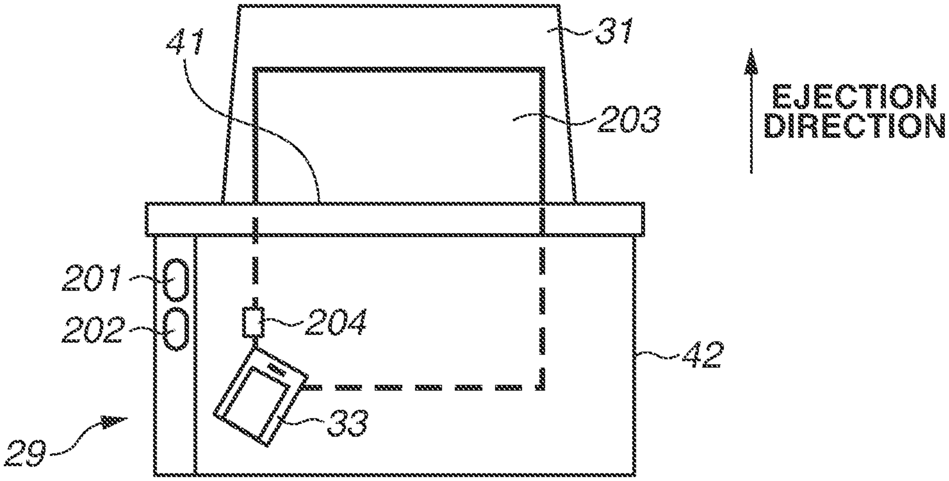
FIG. 2 is an overhead view of a post-processing apparatus.

FIG. 2 is an overhead view of the post-processing apparatus 29 according to the present exemplary embodiment. The post-processing apparatus 29 includes a manual stapling mode shift button 201 and a manual stapling execution button 202 (hereinafter referred to as a shift button 201 and an execution button 202, respectively). Further, the post-processing apparatus 29 includes a sheet detection sensor 204 for detecting the sheet bundle 203 inserted into the staple tray 32. The post-processing apparatus 29 of the present exemplary embodiment has a configuration in which the user inserts the sheet bundle 203 into the staple tray 32 from the discharge port 41, thereby performing the manual stapling. Here, the discharge port 41 is an opening for discharging the stapled sheet bundle to the discharge tray 30 or 31 in the automatic stapling.

When performing the manual stapling, the post-processing apparatus 29 moves the discharge roller pair 36 and the drawing roller 37 in FIG. 1 to the respective dotted line positions, by the user pressing the shift button 201. This prevents a failure when the user inserts the sheet bundle 203. The sheet bundle 203 inserted from the outside of the apparatus body 42 through the discharge port 41 is detected by the sheet detection sensor 204. When the sheet detection sensor 204 detects the sheet bundle 203, the post-processing apparatus 29 enters a manually staple execution waiting state. When the user presses the execution button 202, an instruction to execute the staple processing is issued, and the post-processing apparatus 29 performs the staple processing by the staple unit 33. After completing the manually staple processing, the post-processing apparatus 29 controls the discharge roller pair 36 and the drawing roller 37 in FIG. 1 to move to the respective positions indicated by the solid line and rotate in the forward direction, to discharge the sheet bundle 203 to the discharge tray 30 or 31. Thus, each of the discharge roller pair 36 and the drawing roller 37 is configured to be movable between the solid line position and the dotted line position.

Figure 3:
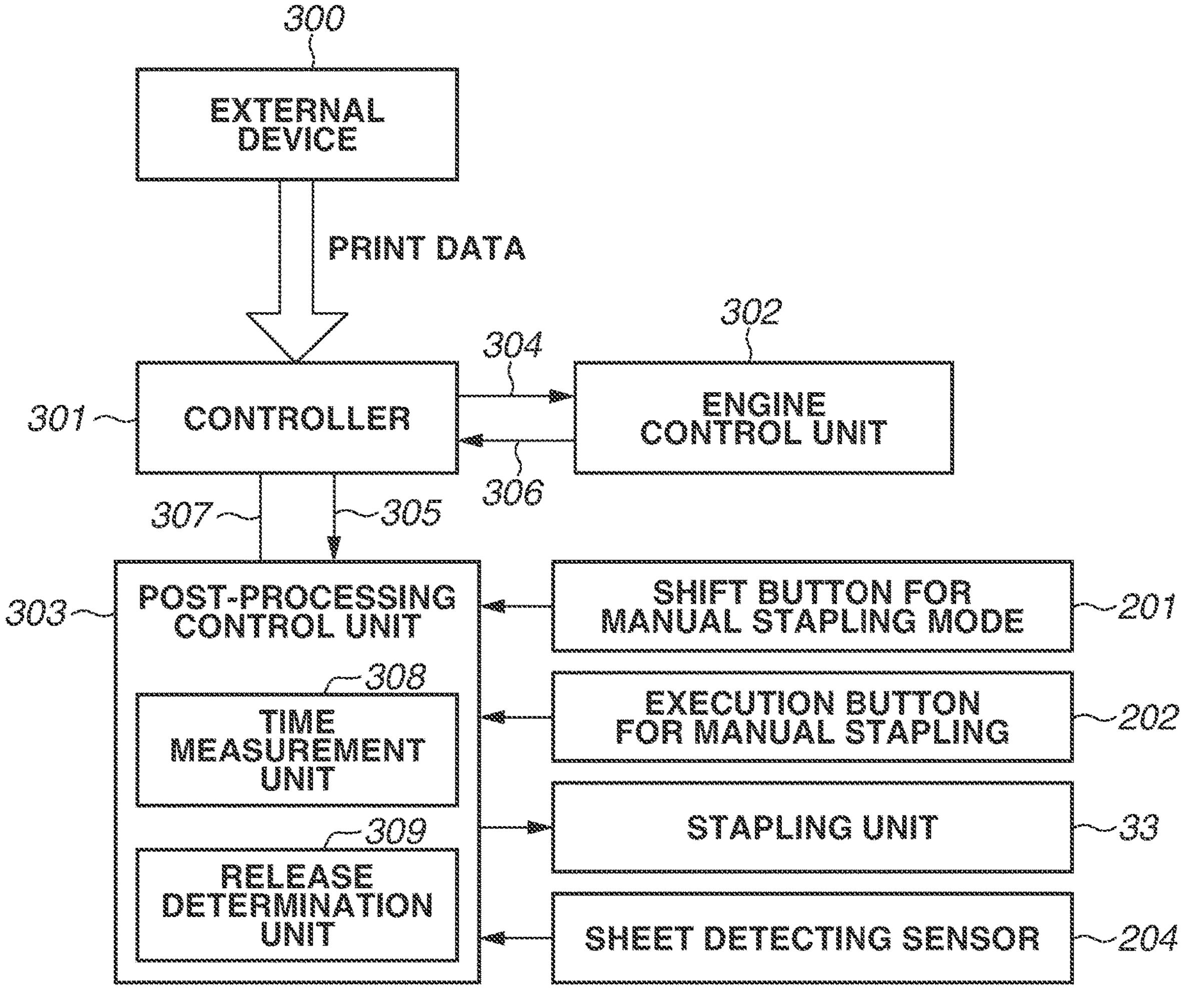
FIG. 3 is a control block diagram of the image forming system.

FIG. 3 is a block diagram for explaining a system configuration of the image forming apparatus 101 and the post-processing apparatus 29. A controller 301 communicates with an external device 300 such as a host computer to receive print data. Further, the controller 301 controls the image forming apparatus 101 and the post-processing apparatus 29 in an integrated manner, an engine control unit 302 controls the image forming apparatus 101, and the post-processing control unit 303 controls the post-processing apparatus 29. A serial signal line 304 is a signal line for transmitting a command signal from the controller 301 to the engine control unit 302, and a serial signal line 305 is a signal line for transmitting a command signal from the controller 301 to the post-processing control unit 303. A serial signal line 306 is a signal line for transmitting status data from the engine control unit 302 to the controller 301, and a serial signal line 307 is a signal line for transmitting status data from the post-processing control unit 303 to the controller 301, responsive to a command signal. The controller 301 transmits the command signals to the engine control unit 302 and the post-processing control unit 303, and controls the engine control unit 302 and the post-processing control unit 303 based on receiving the status data from the engine control unit 302 and the post-processing control unit 303. In this manner, when a plurality of devices is connected and operated, the controller 301 centrally manages the control and state of each device, thereby maintaining the consistency between the operations between the devices. The controller 301 and the engine control unit 302 are provided in the image forming apparatus 101, and the post-processing control unit 303 is provided in the post-processing apparatus 29.

The post-processing control unit 303 carries the sheets P in accordance with the command signal from the controller 301. The post-processing control unit 303 can be controlled to switch between the automatic stapling and the manual stapling. When performing the automatic stapling, the post-processing control unit 303 controls the staple unit 33 to perform the staple processing on the bundle of sheets P discharged from the image forming apparatus 101. When performing the manual stapling, the post-processing control unit 303 controls the staple unit 33 based on input signals from the shift button 201, the execution button 202, and the sheet detection sensor 204, to perform the staple processing. The post-processing control unit 303 includes a time measurement unit 308 and a release determination unit 309. The time measurement unit 308 measures the time elapsed after the sheet detection sensor 204 detects the sheet P. The release determination unit 309 determines whether to release the manual stapling mode.

Figure 4:
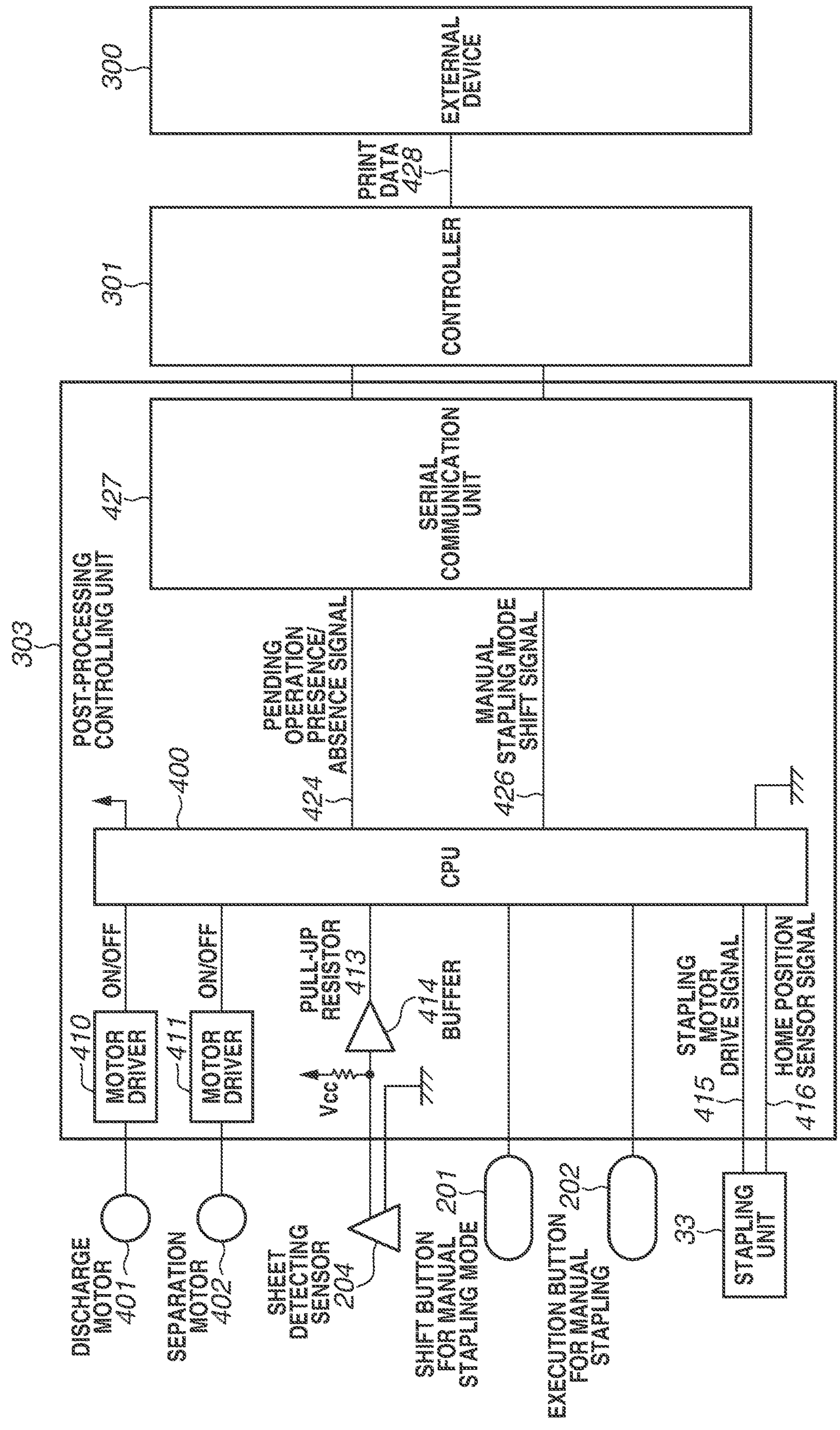
FIG. 4 is a detailed view of the post-processing control unit.

FIG. 4 is a detailed view of the post-processing control unit 303 according to the present exemplary embodiment. The post-processing control unit 303 includes a central processing unit (CPU) 400, and communicates with the controller 301 via a serial communication unit 427. The serial communication unit 427 connects the CPU 400 and the controller 301 through a plurality of signal lines including the serial signal lines 305 and 307. When print data 428 is transferred to the controller 301 through the external device 300, the controller 301 transfers a signal such as a pending operation presence/absence signal 424 to the CPU 400 via the serial communication unit 427. The CPU 400 transfers a signal such as a mode shift signal 426 to the controller 301 via the serial communication unit 427. The respective signals will be described in detail below.

Motor drivers 410 and 411 are connected to an output terminal of the CPU 400. The motor driver 410 drives a discharge motor 401. The discharge motor 401 can rotate the discharge roller pair 36 and the drawing roller 37 forward or reversely by rotating forward or reversely the discharge motor 401. The discharge roller pair 36 and the drawing roller 37 can discharge the sheet P to the discharge tray 30 or 31 by rotating in the forward direction of the discharge roller pair 36 and the drawing roller 37. On the other hand, the discharge roller pair 36 and the drawing roller 37 can draw the sheet P to the staple tray 32 by rotating in the reverse direction of the discharge roller pair 36 and the drawing roller 37. The motor driver 411 drives a separation motor 402. The separation motor 402 can move the discharge roller pair 36 and the drawing roller 37 to a contact position or a separation position by rotating in the forward direction or reverse direction of the separation motor 402. The contact position is a position where each of the discharge roller pair 36 and the drawing roller 37 contacts the sheet P placed on the staple tray 32. The separation position is a position where each of the discharge roller pair 36 and the drawing roller 37 is separated from the sheet P placed on the staple tray 32. The sheet detection sensor 204 uses a pull-up resistor 413 to input a sensor state (ON signal or OFF signal) to the CPU 400 through a buffer 414. Each of the shift button 201 and the execution button 202 inputs the pressing state of the button (ON signal or OFF signal) to the CPU 400. A staple motor drive signal 415 of the staple unit 33 is connected to the output terminal of the CPU 400. A home position sensor signal 416 of the staple unit 33 is connected to the input terminal of the CPU 400. The home position sensor signal 416 is a signal indicating whether the stapler is located at the home position. When performing the staple operation, the CPU 400 drives a staple motor in the staple unit 33 via the staple motor drive signal 415 to perform the staple processing. Then, the CPU 400 stops the staple motor via the staple motor drive signal 415 in accordance with the input value of the home position sensor signal 416.

Figure 5:
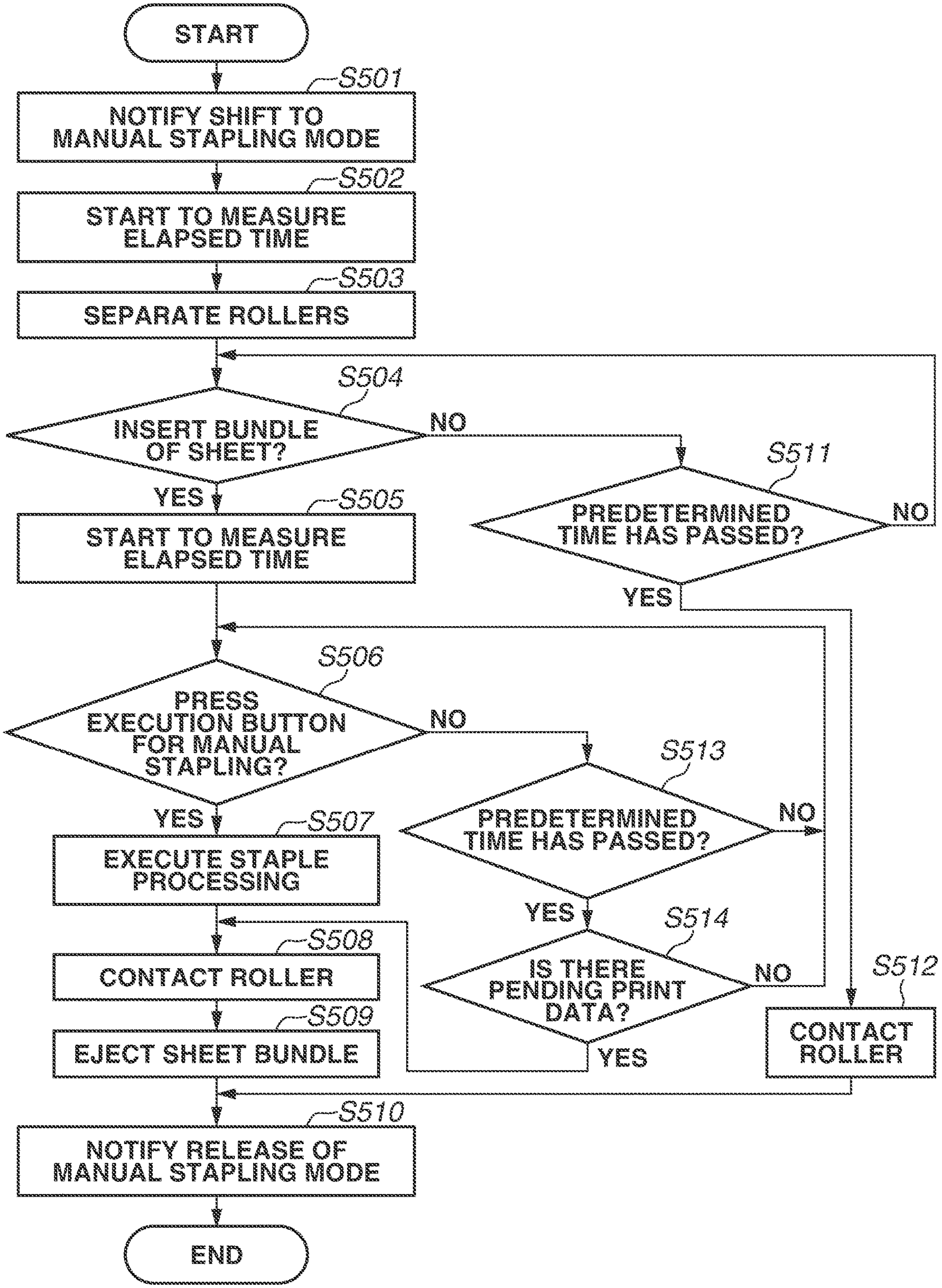
FIG. 5 is a flow chart illustrating the operation of the post-processing control unit according to a first exemplary embodiment.

FIG. 5 is a flow chart illustrating an operation of the post-processing control unit 303 at the time of the manual stapling execution in the present exemplary embodiment. The CPU 400 mounted mainly in the post-processing control unit 303 executes each control illustrated in FIG. 5 based on programs stored in a read only memory (ROM) (not illustrated) or the like.

The flow chart is initiated by pressing the shift button 201 by a user. When initiating the flow chart, the post-processing control unit 303 switches the operation mode to the manual stapling mode. Then, in step S501, the post-processing control unit 303 transmits the mode shift signal 426 to the controller 301 via the serial communication unit 427 to notify that the operation mode has shifted to the manual stapling mode. When a new print instruction is notified from the external device 300 in a state in which the post-processing control unit 303 has been shifted to the manual stapling mode, the controller 301 suspends the processing of the print data 428 corresponding to the print instruction, and stores the print data 428 in a ROM or the like therein. Then, the controller 301 transmits the pending operation presence/absence signal 424 to the post-processing control unit 303 to notify that there is the print data 428 for which the processing is pending. Here, it is assumed that the print instruction is an automatic staple job using the staple tray 32. Subsequently, in step S502, the post-processing control unit 303 resets the count value of the timer counter T to zero (0) seconds, and starts measuring the elapsed time after the shift to the manual stapling mode. Then, in step S503, the post-processing control unit 303 moves the discharge roller pair 36 and the drawing roller 37 to the respective separate positions, and prepares for inserting the sheet bundle from the discharge port 41 by the user.

In step S504, when the sheet detection sensor 204 detects the insertion of the sheet bundle by the user (YES in step S504), the post-processing control unit 303 resets the count value of the timer counter T to zero (0) seconds to start measuring the elapsed time from the insertion of the sheet bundle (step S505). Then, in step S506, the post-processing control unit 303 waits for the user to press the execution button 202. In step S506, when the user presses the execution button 202 (YES in step S506), the post-processing control unit 303 causes the staple unit 33 to execute the staple processing (step S507). Then, the post-processing control unit 303 moves each of the discharge roller pair 36 and the drawing roller 37 to the contact position (step S508), controls the discharge roller pair 36 and the drawing roller 37 to rotate in the normal direction, and discharges the sheet bundle subjected to the manual stapling process to the discharge tray 30 or 31 (step S509). In step S510, the post-processing control unit 303 releases the manual stapling mode, and transmits the mode shift signal 426 to the controller 301 to notify that the manual stapling mode has been released. After the manual stapling mode has been released, the controller 301 controls the engine control unit 302 and the post-processing control unit 303 to start the printing operation, when there is the pending print data 428.

In step S504, when the sheet detection sensor 204 does not detect that the sheet bundle has been inserted by the user (NO in step S504), the release determination unit 309 refers to the count value of the timer counter T of the time measurement unit 308. Then, in step S511, the release determination unit 309 determines whether the elapsed time after the shift to the manual stapling mode has reached a predetermined time. When the elapsed time has not reached the predetermined time (NO in step S511), the release determination unit 309 does not release the manual stapling mode. The processing returns to the detection processing of the sheet bundle insertion in step S504. On the other hand, when the elapsed time has reached the predetermined time (YES in step S511), the release determination unit 309 releases the manual stapling mode. In step S512, the post-processing control unit 303 moves each of the discharge roller pair 36 and the drawing roller 37 to the contact position, and releases the manual stapling mode. Then, in step S510, the post-processing control unit 303 transmits the mode shift signal 426 to the controller 301.

In step S506, when the execution button 202 is not pressed by the user (NO in step S506), the release determination unit 309 refers to the count value of the timer counter T of the time measurement unit 308. Then, in step S513, the release determination unit 309 determines whether the elapsed time from the insertion of the sheet bundle has reached a predetermined time. The predetermined time in step S513 and the predetermined time in step S511 may be the same length of time or different lengths of time. When the elapsed time has not reached the predetermined time (NO in step S513), the release determination unit 309 does not release the manual stapling mode. The processing returns to a standby processing for pressing the execution button 202 in step S506. When the elapsed time has reached the predetermined time (YES in step S513), the post-processing control unit 303 determines whether there is the pending print data 428 based on the reception state of the pending operation presence/absence signal 424 (step S514). When there is no pending print data 428 (NO in step S514), the release determination unit 309 does not release the manual stapling mode. The processing returns to the standby processing for pressing the execution button 202 in step S506. On the other hand, when there is the pending print data 428 in step S514 (YES in step S514), the release determination unit 309 releases the manual stapling mode. In step S508, the post-processing control unit 303 moves each of the discharge roller pair 36 and the drawing roller 37 to the contact position. Then, in step S509, the post-processing control unit 303 controls to rotate the discharge roller pair 36 and the drawing roller 37 in the normal direction, and discharge the sheet bundle not subjected to the staple processing to the discharge tray 30 or 31 (discharge operation). In step S510, the post-processing control unit 303 releases the manual stapling mode, and transmits the mode shift signal 426 to the controller 301 to notify that the manual stapling mode has been released. Since the manual stapling mode has been released, the controller 301 starts processing the pending print data 428, and starts the printing operation As described above, the present exemplary embodiment can release the manual stapling mode when there is the pending print data after the elapse of the predetermined time, by measuring the elapsed time after the user inserts the sheet bundle. Therefore, in the present exemplary embodiment, even when the sheet bundle for the manual stapling has been inserted into the processing tray, it is possible to perform the printing operation, and improve usability.

The present exemplary embodiment has been described with respect to a configuration in which the manual stapling mode has been released in accordance with the two conditions, which include the elapsed time after the sheet bundle for the manual stapling is inserted into the processing tray and the pending state of the automatic stapling job. However, the present disclosure is not limited to the present exemplary embodiment. The present disclosure may omit the condition of the elapsed time, and may release the manual stapling mode in accordance with only the pending (holding) state of the automatic stapling job. In this case, even if the elapsed time after the sheet bundle for manual stapling is inserted into the processing tray has not reached a predetermined time, it is possible to release the manual stapling mode depending on the presence or absence of the pending print data.

In the present exemplary embodiment, the new print instruction is the automatic staple job using the staple tray 32, but the present disclosure is not limited to the present exemplary embodiment. The new print instruction may not be completed by the image forming apparatus 101 alone, but may be a print instruction using the post-processing apparatus 29. As described in FIG. 1, in the configuration of the present exemplary embodiment, the sheet P passes through the staple tray 32 while being discharged to the discharge trays 30 and 31. Therefore, such a new print instruction may be, for example, a print instruction (conveyance instruction) for executing a stack process for stacking the printed sheet P on the discharge tray 30 or 31.

In the first exemplary embodiment, the configuration for releasing the manual stapling mode according to the two conditions, which includes the elapsed time after the sheet bundle for the manual stapling is inserted into the processing tray and the pending state of the automatic stapling job, has been described. In a second exemplary embodiment, a description will be given of a configuration for releasing the manual stapling mode in accordance with only the elapsed time after the sheet bundle for the manual stapling is inserted. The description of the main part is the same as that of the first exemplary embodiment, and only the different parts from the first embodiment will be described here.

Figure 6:
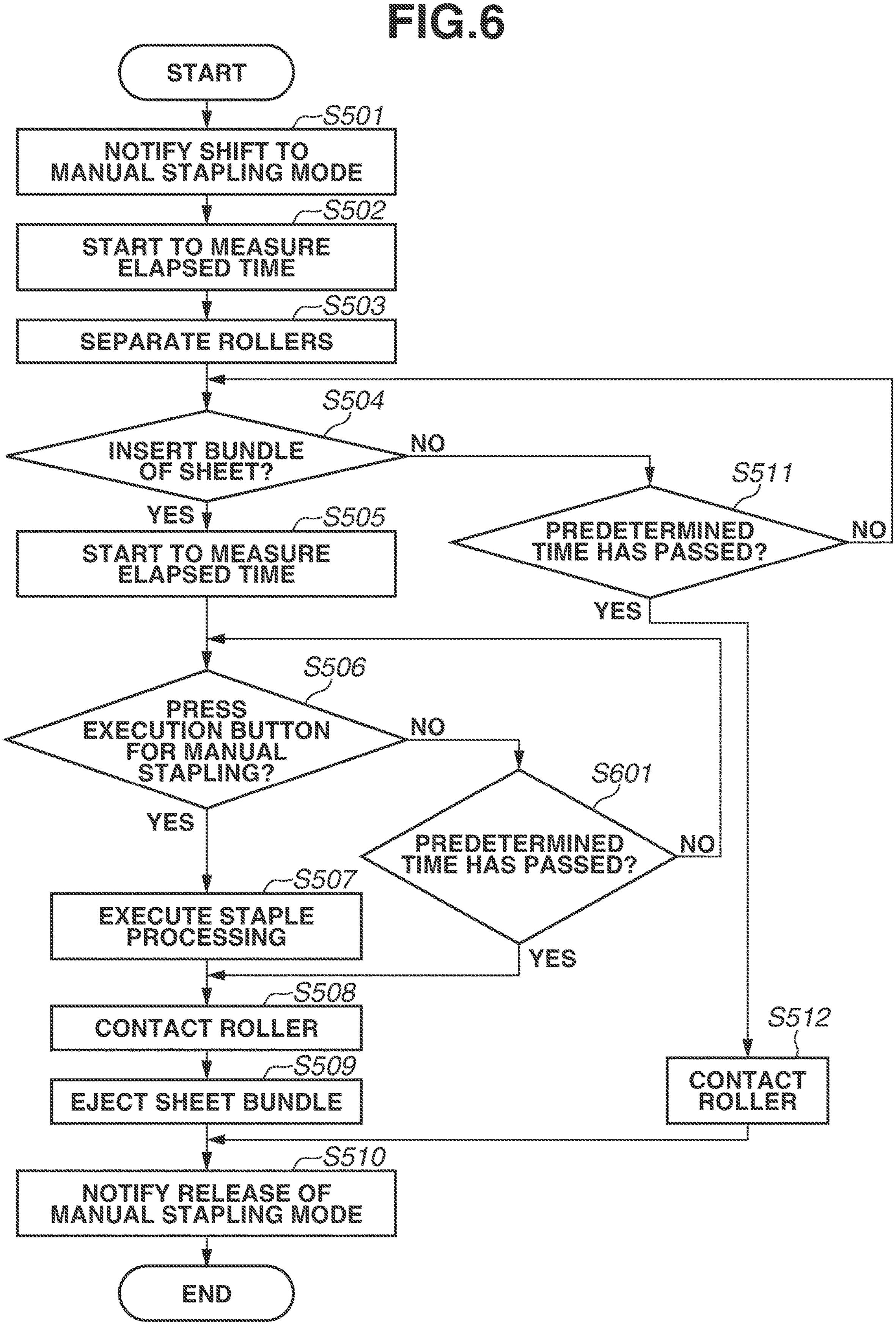
FIG. 6 is a flow chart illustrating the operation of the post-processing control unit according to a second exemplary embodiment.

FIG. 6 is a flow chart illustrating an operation of the post-processing control unit 303 when the manual stapling is executed according to the second exemplary embodiment. The CPU 400 mounted in the post-processing control unit 303 executes each control illustrated in FIG. 6 based on programs stored in a ROM (not illustrated) or the like.

The difference from FIG. 5 described in the first exemplary embodiment is that the second exemplary embodiment have the operation of step S601, which is a determination condition for the release determination unit 309 to release the manual stapling mode, and does not have the process of step S514 for confirming whether there is a pending print instruction. In the second exemplary embodiment, the release determination unit 309 uses only the measurement time of the time measurement unit 308 in the determination condition, and does not use the presence or absence of the pending print instruction. Therefore, step S514 is not necessary. In the flow chart of FIG. 6, only the process of S601 that is different from that of FIG. 5 will be described, and the description of the other processes will be omitted.

In step S601, the release determination unit 309 refers to the count value of the timer counter T of the time measurement unit 308 to determine whether the elapsed time from the insertion of the sheet bundle has reached a predetermined time. When the elapsed time has not reached the predetermined time (NO in step S601), the release determination unit 309 does not release the manual stapling mode. The processing returns to the standby processing for pressing the execution button 202 in step S506. When the elapsed time has reached the predetermined time (YES in step S601), the release determination unit 309 releases the manual stapling mode. In step S508, the post-processing control unit 303 moves each of the discharge roller pair 36 and the drawing roller 37 to the contact position. Then, in step S509, the post-processing control unit 303 rotates the discharge roller pair 36 and the drawing roller 37 in the normal direction, and discharges the sheet bundle not subjected to the staple processing to the discharge tray 30 or 31. In step S510, the post-processing control unit 303 releases the manual stapling mode, and transmits the mode shift signal 426 to the controller 301 to notify that the manual stapling mode has been released. When there is the print instruction, the controller 301 starts the pending printing operation.

As described above, according to the second exemplary embodiment, by measuring the elapsed time after the user inserts the sheet bundle, the manual stapling mode can be released after the elapse of a predetermined time. In addition, unlike the first exemplary embodiment, it is not necessary to transmit information via the serial communication unit 427 between the controller 301 and the post-processing control unit 303. Therefore, the post-processing control unit 303 alone can release the manual stapling mode.

In the above first and second exemplary embodiments, the shift button 201 and the execution button 202 may not be provided on the post-processing apparatus 29, and the buttons may be provided on the image forming apparatus 101. Further, the shift button 201 and the execution button 202 do not have to be physical buttons as described in FIG. 2, and may be virtual buttons displayed on a display or the like.

In the above first and second exemplary embodiments, it is not necessary to provide the post-processing apparatus 29 with a unit for switching the operation mode of the post-processing apparatus 29 as the shift button 201, and for example, it is also possible to employ a configuration in which the operation mode of the post-processing apparatus 29 can be switched from the external device 300.

The example of the laser beam printer has been described in the above first and second exemplary embodiments, but the image forming apparatus to which the present disclosure is applied is not limited thereto, and other printers, such as an ink jet printer, or a copying machine, may be used.

According to the present exemplary embodiments, even in a state where the recording material which is not stapled is left on the processing tray, it is possible to execute the conveyance instruction of the new recording material which uses the processing tray.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming system comprising:

an image forming unit configured to form an image on a recording material;

a processing tray configured to receive the recording material on which the image forming unit forms the image;

a detection unit configured to detect the recording material placed on the processing tray;

a staple unit configured to execute staple processing on the recording material placed on the processing tray;

a discharge unit configured to discharge, from the processing tray through a discharge port, the recording material on which the staple processing is executed by the staple unit;

a discharge tray configured to receive the recording material discharged by the discharge unit;

a selection button configured to be pressed to select manual stapling to execute the staple processing on recording materials manually inserted onto the processing tray through the discharge port from an outside of an apparatus body;

an instruction button configured to be pressed to issue a stapling instruction for executing the staple processing by the staple unit in a state where the manual stapling is selected; and a control unit configured to release the manual stapling, cause the discharge unit to discharge the recording materials inserted onto the processing tray to the discharge tray without executing the staple processing, and cause the image forming unit to form the image on the recording material in a case where (i) a printing instruction is issued in a state where the manual stapling is selected using the selection button, (ii) the recording materials manually inserted onto the processing tray are detected by the detection unit and (iii) a predetermined time has elapsed without the stapling instruction, to release the manual stapling and cause the image forming unit to form the image on the recording material in a case where (i) the printing instruction is issued in a state where the manual stapling is selected using the selection button and (iii) the predetermined time has elapsed without the recording materials manually inserted onto the processing tray being detected by the detection unit, and not to release the manual stapling but cause the image forming unit to suspend forming the image in a case where (i) the printing instruction is issued in a state where the manual stapling is selected using the selection button, (ii) the recording materials to be manually inserted onto the processing tray are not detected by the detection unit, and (iii) the predetermined time has not elapsed.

2. The image forming system according to claim 1, wherein the control unit releases the selection of the manual stapling and causes the image forming unit to form the image in response to the printing instruction being issued in the state where the manual stapling is selected.

3. The image forming system according to claim 1, wherein the control unit releases the selection of the manual stapling after causing the staple unit to execute the staple processing.

4. The image forming system according to claim 1, wherein the discharge unit includes a roller movable between a contact position in contact with the recording material placed on the processing tray and a separation position separated from the recording material placed on the processing tray, and wherein the control unit causes the roller to move to the separation position when the manual stapling is selected, and causes the roller to move to the contact position when the manual stapling is released.

5. The image forming system according to claim 4, wherein, when the control unit causes the discharge unit to perform discharge in a state where the roller is in the separation position, the control unit causes the roller in the separation position to move to the contact position.

* * * * *